United States Patent
Erkek et al.

(10) Patent No.: US 10,813,513 B2
(45) Date of Patent: Oct. 27, 2020

(54) METHOD FOR OPERATING A HOUSEHOLD APPLIANCE WITH AN ACCUMULATOR

(71) Applicant: Vorwerk & Co. Interholding GmbH, Wuppertal (DE)

(72) Inventors: David Erkek, Aarau (CH); Georg Hackert, Bochum (DE); Gerhard Isenberg, Cologne (DE); Roman Ortmann, Huerth (DE); Andreas Schmidt, Mettmann (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 152 days.

(21) Appl. No.: 15/995,327

(22) Filed: Jun. 1, 2018

(65) Prior Publication Data

US 2018/0353039 A1    Dec. 13, 2018

(30) Foreign Application Priority Data

Jun. 8, 2017    (DE) .................. 10 2017 112 663

(51) Int. Cl.
*A47L 9/28* (2006.01)
*G05D 1/02* (2020.01)
*A47L 11/40* (2006.01)

(52) U.S. Cl.
CPC ......... *A47L 9/2884* (2013.01); *A47L 11/4066* (2013.01); *G05D 1/0272* (2013.01); *A47L 2201/022* (2013.01); *A47L 2201/04* (2013.01); *G05D 2201/0215* (2013.01)

(58) Field of Classification Search
CPC ........ A47L 9/28; A47L 11/40; A47L 11/4066; A47L 2201/022; G05D 1/02; G05D 1/0272; G05D 2201/0215; H02J 3/38; H02J 3/383; H02J 3/386; H02J 9/00; H02J 7/00; H02J 7/10; H01M 10/46; B60K 8/00
USPC ........ 307/66, 64, 48, 85, 80; 363/21, 18, 19, 363/20; 320/2, 120; 318/257; 331/112
See application file for complete search history.

(56) References Cited

U.S. PATENT DOCUMENTS

| | | | | |
|---|---|---|---|---|
| 5,489,807 | A * | 2/1996 | Sanjuan | A47J 43/082 307/48 |
| 5,625,540 | A * | 4/1997 | Bergk | H02J 7/022 363/19 |
| 7,408,272 | B2 * | 8/2008 | Marquet | H02J 7/0054 307/48 |
| 7,420,352 | B2 * | 9/2008 | Kranz | H02J 7/1423 180/54.1 |
| 8,475,367 | B1 * | 7/2013 | Yuen | G06F 19/3418 600/300 |

(Continued)

FOREIGN PATENT DOCUMENTS

| | | |
|---|---|---|
| JP | 2004-305495 A | 11/2004 |
| WO | 2016/146194 A1 | 9/2016 |

*Primary Examiner* — Rexford N Barnie
*Assistant Examiner* — Jagdeep S Dhillon
(74) *Attorney, Agent, or Firm* — Collard & Roe, P.C.

(57) ABSTRACT

A method for operating a household appliance with an accumulator, wherein a charging start time of a charging operation for charging the accumulator is controlled in dependence on predefined conditions. In order to ensure a required charge capacity of the accumulator without a charge maintaining mode, it is proposed that the charging start time is controlled in dependence on a charging period and a predefined time of use of the household appliance.

8 Claims, 1 Drawing Sheet

(56) References Cited

U.S. PATENT DOCUMENTS

| | | | |
|---|---|---|---|
| 2010/0085017 A1* | 4/2010 | Heeringa | B26B 19/3873 320/149 |
| 2010/0090534 A1* | 4/2010 | Federmann | H02J 9/005 307/66 |
| 2011/0204720 A1* | 8/2011 | Ruiz | B60L 53/14 307/66 |
| 2011/0251731 A1* | 10/2011 | Yang | H02J 3/14 700/296 |
| 2012/0112698 A1* | 5/2012 | Yoshimura | G06Q 50/06 320/109 |
| 2012/0242293 A1* | 9/2012 | Yumura | H02J 3/32 320/134 |
| 2013/0009607 A1* | 1/2013 | Nishibayashi | B60L 53/63 320/162 |
| 2014/0049053 A1* | 2/2014 | Inoue | H02J 3/381 290/30 R |
| 2015/0165918 A1* | 6/2015 | Shizuno | B60L 53/68 320/109 |
| 2016/0087438 A1* | 3/2016 | Tagliaro | H02J 3/32 307/126 |
| 2017/0045903 A1* | 2/2017 | Hashimoto | G05F 1/66 |
| 2018/0316801 A1* | 11/2018 | Oikawa | H04N 1/00079 |
| 2019/0265281 A1* | 8/2019 | Li | G01R 21/06 |

* cited by examiner

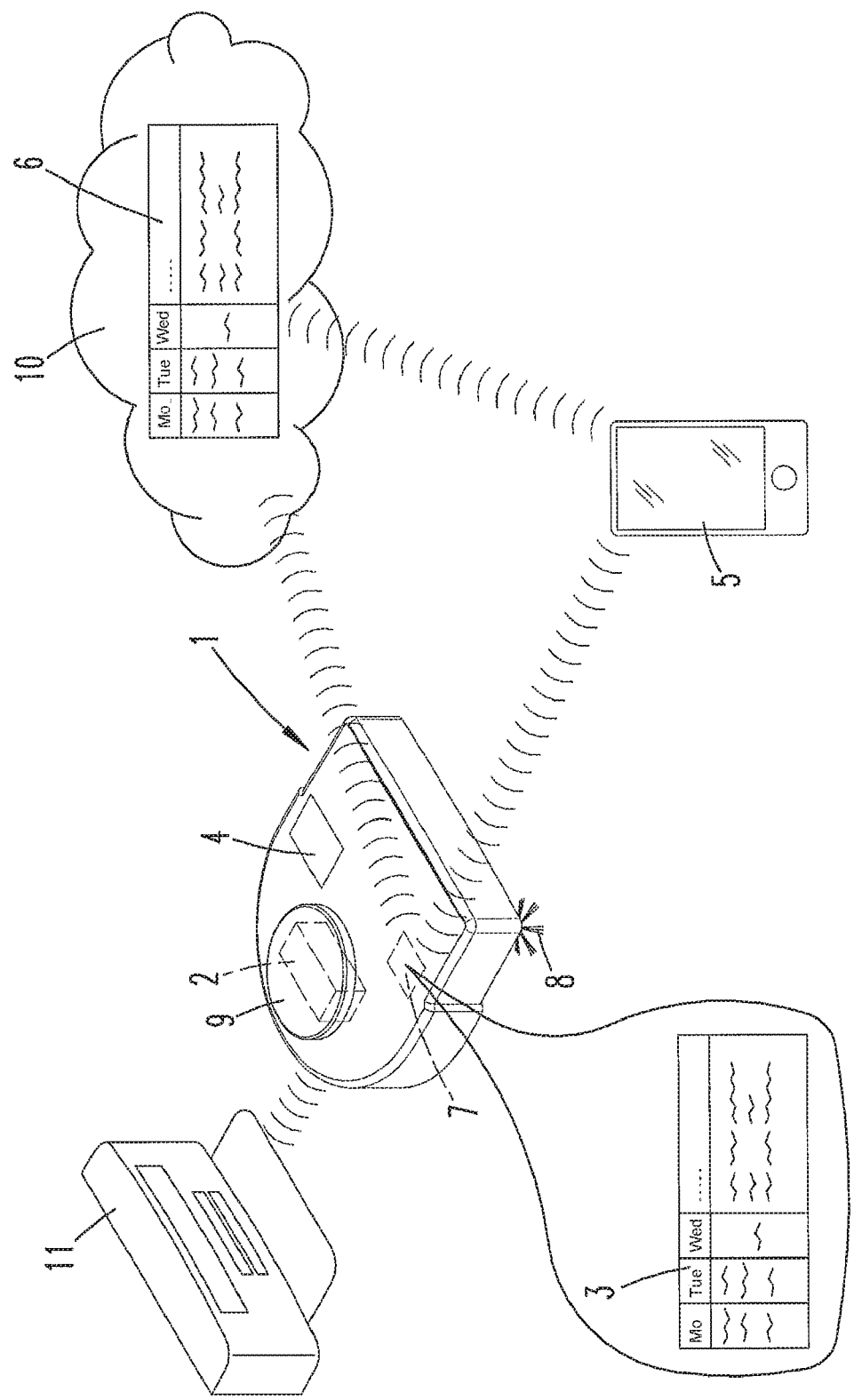

METHOD FOR OPERATING A HOUSEHOLD APPLIANCE WITH AN ACCUMULATOR

CROSS REFERENCE TO RELATED APPLICATIONS

Applicant claims priority under 35 U.S.C. § 119 of German Application No. 10 2017 112 663.5 filed Jun. 8, 2017, the disclosure of which is incorporated by reference.

BACKGROUND OF THE INVENTION

1. Field of the Invention

The invention pertains to a method for operating a household appliance with an accumulator, wherein a charging start time of a charging operation for charging the accumulator is controlled in dependence on predefined conditions.

The invention furthermore pertains to a household appliance with an accumulator and a control and evaluation device for controlling a charging start time of a charging operation of the accumulator.

2. Description of the Related Art

Methods and household appliances of the aforementioned type are known from the prior art.

In the context of the invention, household appliances are, for example, cleaning apparatuses such as a vacuum cleaners, wet-wiping apparatuses and/or combinations thereof, electromotively operated kitchen appliances, electromotively operated tools, grinding and/or polishing apparatuses, lawnmowers and the like. This particularly also includes self-traveling household appliances, for example, in the form of vacuuming robots, wiping robots, lawnmowing robots, polishing robots and the like.

It is known to charge the accumulator of a household appliance by means of a charging station and/or a charging network, wherein a charging start time is controlled in accordance with predefined conditions.

For example, publication JP 2004-305495 A discloses a control of a charging start time for a vacuum cleaner, wherein the charging start time occurs at the same time every day, for example, in order to utilize reduced electricity rates during the night or variably in dependence on the energy generation of a photovoltaic system.

For example, publication WO 2016/146194 A1 furthermore discloses a tool case with an integrated charging station and a hand tool, wherein a charging start time begins when the tool case is opened or closed and a charging speed is varied between a fast charging operation and a standard charging operation.

The disadvantage of these known solutions can be seen in that charging of the accumulator is controlled so as to start at a certain time and the accumulator has to be continuously recharged in a charge maintaining mode after the completion of an entire charging operation in order to maintain maximum capacity. The charge maintaining mode reduces the service life of the accumulator.

SUMMARY OF THE INVENTION

Based on the aforementioned prior art, the invention aims to respectively enhance an above-described method and a household appliance using a method of this type in such a way that a charge maintaining mode for the accumulator can be eliminated and a required charge capacity is nevertheless available at the time of use.

In order to attain this objective, the invention proposes that the charging start time is controlled based on a charging period and a predefined time of use of the household appliance.

According to the invention, the charging start time, at which the charging operation of the accumulator begins, is now scheduled, particularly delayed, in such a way that the charging operation is completed exactly when the time of use of the household appliance is reached, i.e. at the time, at which the household appliance should be used. The charging start time of the charging operation is therefore defined in dependence on the scheduled time of use in such a way that the accumulator is charged with the required charge capacity at the time of the scheduled use and a charge maintaining mode is therefore no longer required. Consequently, the invention eliminates the negative effects of the charge maintaining mode on the accumulator, namely the reduction of the service life of the accumulator due to the accelerated aging process caused by the charge maintaining mode. In addition, the required charge capacity is made available in a particularly power-saving fashion because the charge capacity is ensured exactly at the time, at which the household appliance is used, without requiring a charge maintaining mode. The charging start time may be controlled by a control device of the household appliance, which takes into account the charging period and the time of use of the household appliance, or alternatively by an external control device that accesses the household appliance, particularly via a communication link established between the household appliance and the external control unit. Furthermore, the charging start time may also be controlled based on an interaction between a control device of the household appliance and an external control device, particularly by carrying out a data exchange.

It is particularly proposed to calculate an expected charging period for reaching a required charge capacity. In order to calculate the delayed charging start time, the expected charging period has to be deducted from the known time of use, at which the household appliance is needed, such that the charging period is completed exactly when the household appliance is needed. The required charging period is calculated by taking into account the required charge capacity and the percentage, by which the accumulator may already be charged. Based on the charging start time, the time of use of the household appliance results from the addition of the calculated charging period.

It is furthermore proposed to determine the time of use based on a usage schedule of the household appliance that contains defined times of use and/or operating modes of the household appliance. The usage schedule may be stored within a memory of the household appliance or within a memory arranged externally of the household appliance. For example, the usage schedule contains a calendrical database with seasons, months, weekdays, times and the like, at which the household appliance is used. The usage schedule may particularly contain the use of the household appliance in different rooms of a residence. Furthermore, an operating mode of the household appliance such as, for example, a cleaning operation in a power saving mode, a spot-cleaning operation for cleaning a particularly soiled region of a room or a residence and the like may also be stored within the usage schedule. In order to calculate the charging start time, an evaluation and control device accesses this usage schedule, checks when the next time of use of the household appliance is scheduled and, if applicable, the scheduled time of use and calculates the charging start time, i.e. the time, at which the charging operation of the accumulator has to begin in order to complete the charging operation exactly at the scheduled time of use, with consideration of the charging period. The usage schedule of the household appliance may particularly also be stored in an external communication device, wherein a data communication, preferably a wireless communication, may be used for this purpose. The external communication device may consist, for example, of a mobile telephone, a tablet computer, a laptop or the like.

It is furthermore proposed to prepare and/or process the usage schedule based on a determined usage pattern of prior times of use and/or operating modes of the household appliance. In order to prepare the usage schedule, prior times of use and/or operating modes of the household appliance are stored and analyzed in order to detect a usage pattern of the household appliance based on the plurality of data. The usage pattern may contain information on days, times and functions of the household appliance used, wherein said information is stored, e.g., in calendar form and, if applicable, in conjunction with probability information that indicates the probability of a repetition of the detected usage pattern. The usage pattern may contain, for example, cleaning processes of a cleaning robot that were repeatedly used in the past, particularly certain times and, if applicable, certain operating modes, at/in which the cleaning apparatus was used. Based on this usage schedule and the usage pattern stored therein, it can be determined when the next use of the household appliance is scheduled and which type of use will be required. Depending on this information, it is possible to recalculate when a charging operation with a calculated or known charging period has to be started in order to charge the accumulator in a timely fashion.

It is proposed that the usage schedule is prepared and/or processed by a user of the household appliance and/or that the usage schedule is prepared and/or processed by means of an operating device of the household appliance or by means of an external device that is communicatively linked to the household appliance. The usage schedule can be input, for example, by means of an operating device such as a keypad or a touchscreen of the household appliance. Alternatively, a user of the household appliance can also input the corresponding information by means of an external device, for example a remote control or a mobile communication device such as a smartphone or tablet computer. Furthermore, the automated preparation and processing, particularly updating, of the usage schedule would also be conceivable, for example, in that an evaluation and control device of the household appliance analyzes and uses a usage pattern for preparing and processing the usage schedule. In this case, no manual input by a user is required, but the usage schedule is rather updated or at least checked every time the household appliance is used again. The preparation and processing of the usage schedule, particularly the registration of times of use, can also be carried out by means of a central unit that is arranged outside the household appliance and has a wireless communication channel, for example via WLAN, Bluetooth or ZigBee, or a wire-bound communication channel, for example Powerline-LAN, to the household appliance. The central unit may be realized in the form of a local unit or in the form of a web server system (cloud).

It would be conceivable to predefine the time of use with consideration of external environmental parameters, particularly weather data. It would furthermore be conceivable to predefine the time of use with consideration of a user calendar that contains scheduled activities of a user. According to this embodiment, external information concerning conditions outside the household appliance is used. For example, this may be information on a current weather situation, information on a degree of soiling of the premises and the like. Based on this information, a time of use of the household appliance can be scheduled and, in particular, usage intervals or even operating periods of the household appliance can be controlled. During rainy weather, for example, it may be more probable that the premises to be cleaned are particularly soiled, that persons are located within the premises and the like. For this purpose, the household appliance or the control and evaluation device calculating the usage schedule can access an external server that makes available weather information. It is particularly advantageous to define a time of use based on a user calendar that contains scheduled activities of a user. Based on this user calendar, it can be determined, for example, when the user is located within the premises, in which room the user is most likely located, which activity the user carries out in the process or when the user will return home. In the case of a cleaning robot, it may be advantageous to use the household appliance while no user is usually located within the premises. If the household appliance consists, for example, of a kitchen appliance, it may in contrast be advantageous to use the household appliance when the user is at home and can intervene in case of a malfunction of the household appliance, for example at the beginning of a cooking process. The times of use of different households appliances such as, for example, cleaning robots, kitchen appliances or other appliances can therefore be scheduled very differently in conjunction with the information on the user calendar, wherein this in turn also affects the optimal charging start time for ensuring that the charging operation of the accumulator of the household appliance is completed at the time of use.

It is proposed that the required charge capacity is a maximum capacity of the accumulator. Accordingly, the charging period for the charging operation is always calculated with respect to a maximum capacity of the accumulator, i.e. a full charge of the accumulator. The required charge capacity is therefore always assumed to be the maximum charge capacity, namely even if only part of the energy stored in the accumulator is required for the scheduled use of the household appliance.

It would furthermore be conceivable to calculate the required charge capacity based on the energy demand of a scheduled use of the household appliance. In this embodiment, the accumulator is only charged as far as required for the scheduled use. The required charge capacity is calculated based on the calculated energy demand. The energy demand is dependent on the type of household appliance, particularly its motor power, an operating mode such as, for example, an energy-saving mode or a particularly energy-intensive operating mode, as well as the scheduled use, i.e. the task to be carried out by the household appliance. If a scheduled use includes, for example, a spot-cleaning mode for cleaning a certain partial area of a room, the minimum charge state of the accumulator for completing the entire scheduled task can be calculated based on the energy demand for this cleaning mode. If the household appliance has to carry out identical or different work tasks in immediate succession or within short time intervals, it is possible to calculate an overall energy demand that in turn defines the required charge capacity. The accumulator therefore does not have to be completely charged during the charging operation of the accumulator. It is furthermore advantageous to reserve a minimum charge capacity of the accumulator in order to allow an at least limited operation of the household appliance at all times. In this way, the household appliance can be used on short notice. The minimum charge capacity can be maintained by means of a threshold value inquiry, wherein a charging operation of the accumulator is carried out regardless of a scheduled time of use when the charge capacity falls short of the threshold value. The minimum charge capacity ensures, for example, that a spontaneous cleaning operation can be carried out with a cleaning apparatus if sudden soiling occurs.

It is furthermore proposed to determine the expected charging period for reaching the required charge capacity based on a current charge capacity and/or based on a current state of the accumulator, particularly an age of the accumulator. The time period required for reaching the desired charge capacity necessary for carrying out the scheduled use differs depending on the current charge capacity of the accumulator, i.e. its current state of charge. If an accumulator is still half charged, for example, the required charging period is shorter than that of an almost completely discharged accumulator. Another factor is the current state of the accumulator, which particularly changes over the course of the operating age of the accumulator. It may therefore be advantageous, in particular, to regularly check the state of the accumulator in order to obtain information on an expected charging period. The control and evaluation device controlling the charging operation therefore receives information on the current state of the accumulator, for example information on a currently still attainable maximum charge capacity of the accumulator, information on the aging state and the like, and can calculate how long a charging operation of the accumulator will last until the desired charge capacity is reached based on this information. The information on the current charge capacity, the maximum attainable charge capacity and/or the age of the accumulator may be registered continuously or within regular time intervals.

In addition to the above-described method for operating a household appliance, the invention furthermore proposes a household appliance with an accumulator and a control and evaluation device for controlling a charging start time of a charging operation of the accumulator, wherein the control and evaluation device is designed and realized for carrying out a method according to one of the above-described embodiments. The household appliance may consist of different apparatuses such as, for example, cleaning apparatuses, kitchen appliances, mowing robots, polishing apparatuses, window cleaning apparatuses or other apparatuses that feature an accumulator. The inventive household appliance particularly consists of a self-traveling household appliance, especially a vacuuming robot, a wiping robot, a lawnmowing robot or the like.

In the context of a system, the household appliance is compatible with a charging station that is suitable for charging the accumulator of the household appliance. Within the system, the control and evaluation device may either be assigned to the household appliance or the charging station, wherein the household appliance and the charging station advantageously are communicatively linked to one another. A memory for storing the above-described usage schedule may be a memory of the household appliance, a memory of the charging station, a memory of an external device or a web server. Other characteristics and advantages of the household appliance or the system consisting of the household appliance and the charging station or an external device or external memory can be gathered from the preceding description of the method.

BRIEF DESCRIPTION OF THE DRAWINGS

The invention is described in greater detail below with reference to an exemplary embodiment. In the drawing:

FIG. 1 shows a system consisting of a household appliance, a charging station, an external device and a web server.

DETAILED DESCRIPTION OF PREFERRED EMBODIMENTS

FIG. 1 shows a household appliance 1, which is realized in the form of a self-traveling cleaning robot in this case. The household appliance 1 particularly consists of a vacuuming robot with multiple cleaning elements 8, which include, among other things, the lateral blush visible in FIGURE. The household appliance 1 conventionally features driven wheels, by means of which the household appliance 1 can travel within one or more rooms. In this case, the household appliance 1 is furthermore provided with a distance measuring device 9, for example a triangulation measuring device, which measures distances from obstacles and serves for the navigation of the household appliance 1 within the premises. The household appliance 1 features an accumulator 2, an operating device 4 and a memory 7. In this case, the operating device 4 consists of a touch-sensitive display, namely a touchscreen, by means of which a user can transmit inputs and commands to the household appliance 1. The operating device 4 may alternatively or additionally also feature keys, buttons, rotary dials or the like, by means of which an input can be realized.

A not-shown communication device links the household appliance 1 in a wireless fashion to an external device 5, in this case a mobile telephone, as well as to a charging station 11 that serves for charging the accumulator 2 of the household appliance 1 and an external memory 10, which is made available on a web server in this case. The household appliance 1 can be conventionally connected to the charging station 11, particularly by traveling to the charging station 11 by itself, such that the accumulator 2 can be charged at this charging station. To this end, the household appliance 1 and the charging station 11 feature corresponding electrical contacts or, if applicable, alternatively an inductive charging device.

According to the exemplary embodiment shown, which nevertheless should by no means be interpreted in a restrictive sense, a user calendar 6 is stored in the external memory 10, wherein said user calendar is an appointment calendar of a user that contains activities of the user listed by weekdays, for example meetings, doctor's appointments, dates for club activities and the like. The internal memory 7 of the household appliance 1 furthermore features a usage schedule 3 of the household appliance 1, which contains times of use of the household appliance 1 that are also scheduled and/or recur in calendar form.

According to an inventive method for operating the household appliance 1, it is proposed that multiple dates, on which the household appliance 1 has to carry out a vacuum cleaning operation within one or more rooms of a residence, are stored in the usage schedule 3 of the household appliance 1. For example, the usage schedule 3 specifies a vacuum cleaning operation in a certain room, in this example a kitchen, on a certain weekday, in this example next Monday. The scheduled time of use is set, for example, for 10:00 a.m. An expected charging period, which is required for completely charging the accumulator 2, is calculated in order to ensure that the accumulator 2 of the household appliance 1 has the required charge capacity, preferably that the accumulator is fully charged, at this scheduled time of use. In order to calculate the charging period, a control and evaluation device of the household appliance 1 requests information on a current charge capacity of the accumulator 2 and, if applicable, on any existing error conditions or charging period delays caused by a progressive aging state of the household appliance 1. A capacity difference to be compensated within the charging operation is then calculated from the difference between the desired charge capacity and the current charge capacity of the accumulator 2. It is subsequently calculated how long the charging period is expected to last with consideration of the power output of the charging station 11 for the charging operation. Based on the scheduled time of use, it is then recalculated when the charging operation has to be started in order to be finished in a timely fashion at the scheduled time of use after the completion of the entire charging period. If a charging period of two hours is calculated, for example, the charging start time has to be set for 8:00 a.m. The control and evaluation device of the household appliance 1 now controls the household appliance 1 in such a way that it travels to the charging station 11 in time for being charged at this charging station. In this way, the accumulator 2 is prevented from being prematurely charged such that the need for a charge maintaining mode after the completion of the entire charging operation and prior to reaching the time of use of the household appliance 1 is eliminated.

Furthermore, a plurality of modified embodiments, in which the household appliance 1 communicates with the external device 5 and/or the external memory 10 in order to control the charging start time for the charging operation of the accumulator 2, are conceivable based on this exemplary use of the household appliance 1. For example, it would be conceivable that information on the times of use and/or the operating modes of the household appliance 1 is stored within the memory 7 or alternatively within the external memory 10 and analyzed with respect to a recurring usage pattern. For example, the usage pattern may contain information to the effect that certain operating modes of the household appliance 1 recur at certain times. Based on this information, the usage schedule 3 of the household appliance 1, which provides information on upcoming uses of the household appliance 1 in the near future, is prepared or updated. In addition, an external memory 10 on a web server or on an external device 5, in this example the mobile telephone, may comprise a user calendar 6 that contains appointments and, in particular, times at which the user is absent. The information on the user calendar 6 can be combined with the information on the usage schedule 3 in order to respectively schedule or define the next use of the household appliance 1 and therefore to calculate a charging start time for charging the accumulator 2. The usage schedule 3 and the user calendar 6 may also be merged into a common calendar. Furthermore, other information such as, for example, information on a current weather situation and the like can also be used. In addition to preparing the usage schedule 3 automatically, for example, based on recurring usage patterns, it would also be conceivable that a user makes manual inputs by means of the operating device 4 of the household appliance 1 or by means of the external device 5. For example, these inputs may comprise times of use, which the user supplements within the usage schedule 3. If multiple uses of the household appliance 1 are scheduled within short time intervals, an overall energy demand for optimally carrying out the successive uses can be calculated. The required charge capacity of the accumulator can then be determined based on the calculated overall energy. This in turn defines the required charging period and the charging start time to be observed in order to charge the accumulator 2 in time prior to the beginning of the first activity.

LIST OF REFERENCE SYMBOLS

1 Household appliance
2 Accumulator
3 Usage schedule
4 Operating device
5 External device
6 User calendar
7 Memory
8 Cleaning element
9 Distance measuring device
10 External memory
11 Charging station

What is claimed is:

1. A method for operating a household appliance with an accumulator and a control and evaluation device for controlling a charging start time of a charging operation of the accumulator, comprising the following steps:
    controlling by the control and evaluation device of the household appliance a charging start time of a charging operation for charging the accumulator based on pre-defined conditions, wherein the charging start time is controlled based on a charging period and a predefined time of a defined use of the household appliance in such a way that the charging operation is completed exactly when the time of use is reached,
    calculating by the control and evaluation device of the household appliance an expected charging period for reaching a required charge capacity, and
    calculating by the control and evaluation device of the household appliance the required charge capacity based on an energy demand for a scheduled use of the household appliance,
    wherein the steps of calculating include the following steps consecutively operated by the control and evaluation device of the household appliance:
    determining the time of use, at which the household appliance is needed for the scheduled use, according to a usage schedule of the household appliance,
    calculating the energy demand for the scheduled use,
    calculating the required charge capacity that corresponds to the energy demand,
    calculating the expected charging period for reaching the required charge capacity, with consideration of a power output of a charging station used for the charging operation, and
    recalculating the charging start time at which the charging operation must be started in order to be finished at the scheduled time of use based on the scheduled time of use and on the calculated charging period.

2. The method according to claim 1, wherein the time of use is determined based on a usage schedule of the household appliance, which contains predefined times of use and/or operating modes of the household appliance.

3. The method according to claim 2, wherein the usage schedule is prepared and/or processed based on a determined usage pattern of prior times of use and/or operating modes of the household appliance.

4. The method according to claim 2, wherein the usage schedule is prepared and/or processed by a user of the household appliance, or by means of an operating device of the household appliance, or by means of an external device that is communicatively linked to the household appliance.

5. The method according to claim 1, wherein the time of use is predefined with consideration of external environmental parameters.

6. he method according to claim 1, wherein the required charge capacity is a maximum capacity of the accumulator.

7. The method according to claim 1, wherein the expected charging period for reaching the required charge capacity is determined based on a current charge capacity and/or based on a current state of the accumulator.

8. A household appliance with an accumulator and a control and evaluation device for controlling a charging start time of a charging operation of the accumulator, wherein the control and evaluation device is designed and configured for performing the following steps:
   controlling by the control and evaluation device of the household appliance a charging start time of the charging operation for charging the accumulator based on predefined conditions, wherein the charging start time is controlled based on a charging period and a predefined time of defined use of the household appliance in such a way that the charging operation is completed exactly when the time of use is reached,
   calculating by the control and evaluation device of the household appliance an expected charging period for reaching a required charge capacity, and
   calculating by the control and evaluation device of the household appliance the required charge capacity based on an energy demand for a scheduled use of the household appliance,
   wherein the steps of calculating include the following steps consecutively operated by the control and evaluation device of the household appliance:
   determining the time of use, at which the household appliance is needed for the scheduled use, according to a usage schedule of the household appliance,
   calculating the energy demand for the scheduled use,
   calculating the required charge capacity that corresponds to the energy demand,
   calculating the expected charging period for reaching the required charge capacity, with consideration of a power output of a charging station used for the charging operation, and
   recalculating the charging start time at which the charging operation must be started in order to be finished at the scheduled time of use based on the scheduled time of use and on the calculated charging period.

* * * * *